(12) United States Patent
Koskela et al.

(10) Patent No.: US 8,811,309 B2
(45) Date of Patent: Aug. 19, 2014

(54) IMPLICIT RESOURCE ALLOCATION USING SHIFTED SYNCHRONIZATION SEQUENCE

(75) Inventors: Timo Kalevi Koskela, Oulu (FI); Sami-Jukka Hakola, Kempele (FI); Samuli Turtinen, Ii (FI); Ville-Vesa Haikola, Oulu (FI)

(73) Assignee: Nokia Corporation, Espoo (FI)

( * ) Notice: Subject to any disclaimer, the term of this patent is extended or adjusted under 35 U.S.C. 154(b) by 457 days.

(21) Appl. No.: 12/960,116

(22) Filed: Dec. 3, 2010

(65) Prior Publication Data

US 2012/0140714 A1 Jun. 7, 2012

(51) Int. Cl.
*H04W 4/00* (2009.01)
(52) U.S. Cl.
USPC ........... 370/329; 370/315; 370/335; 370/332; 370/350; 375/150; 375/260; 455/425; 455/434; 455/522; 455/450; 455/455
(58) Field of Classification Search
USPC ................. 370/329, 315, 335, 328, 332, 350; 375/150, 260; 455/425, 434, 522, 450, 455/455
See application file for complete search history.

(56) References Cited

U.S. PATENT DOCUMENTS

| | | | |
|---|---|---|---|
| 7,808,967 B2 | 10/2010 | Han et al. | |
| 2004/0207556 A1* | 10/2004 | Spilker et al. | 342/464 |
| 2008/0008206 A1 | 1/2008 | Cho et al. | |
| 2009/0034589 A1* | 2/2009 | Hahm et al. | 375/150 |
| 2009/0196240 A1 | 8/2009 | Frederiksen et al. | |
| 2009/0310782 A1* | 12/2009 | Dabak et al. | 380/255 |
| 2010/0111000 A1* | 5/2010 | Saidi et al. | 370/329 |
| 2010/0261472 A1* | 10/2010 | Han et al. | 455/434 |
| 2011/0051621 A1* | 3/2011 | Kwak et al. | 370/252 |
| 2011/0194500 A1* | 8/2011 | Kim et al. | 370/328 |
| 2011/0207453 A1* | 8/2011 | Hsu et al. | 455/424 |
| 2011/0317780 A1* | 12/2011 | Kang et al. | 375/260 |
| 2012/0127961 A1* | 5/2012 | Kawamura et al. | 370/335 |
| 2013/0021984 A1* | 1/2013 | Han et al. | 370/329 |
| 2013/0064169 A1* | 3/2013 | Song et al. | 370/315 |
| 2013/0287015 A1* | 10/2013 | Han et al. | 370/350 |

FOREIGN PATENT DOCUMENTS

WO WO 2010127708 A1 11/2010

OTHER PUBLICATIONS

LTE for 4G Mobile Broadband by Farooq Khan Cambridge University Press 2009.*
IEEE Computer Society, "IEEE Standard for Information Technology—Telecommunication and Information Exchange Between Systems—Local and Metropolitan Networks—Specific Requirements," Part 11: Wireless LAN Medium Access Control (MAC) and Physical Layer (PHY) Specifications, Jun. 12, 2007, Chapter 17, pp. 591-637.
3GPP TS 36.211 V 9.1.0, Mar. 3, 2010, Chapter 6, pp. 41-79.
LTE, The UMTS Long Term Evolution: Form Theory to Practice, Edited by Sesia et al., pp. 142-143 and 146-147.

* cited by examiner

*Primary Examiner* — Faruk Hamza
*Assistant Examiner* — Shah R Zaman
(74) *Attorney, Agent, or Firm* — Squire Patton Boggs (US) LLP (57) ABSTRACT

A method, apparatus, system, and computer readable medium are provided that can utilize one or more synchronization signals to perform synchronization and resource allocation. The one or more synchronization signals can be used for synchronization, as well as include a cyclic shift that maps one or more resources for transmission.

20 Claims, 7 Drawing Sheets

IMPLICIT RESOURCE ALLOCATION USING SHIFTED SYNCHRONIZATION SEQUENCE

BACKGROUND

1. Field

Certain embodiments of the invention relate generally to communication systems, and more particularly, to cellular communication systems that utilize radio access technologies (RATs), such as Global System for Mobile Communications (GSM), Universal Mobile Telecommunications System (UMTS), and Third Generation Partnership Project (3GPP) Long-Term Evolution (LTE).

2. Description of the Related Art

Cellular communication systems utilize radio frequencies for the transmission and reception of its signals. A band is a plurality of radio frequencies, in which channels are generally used for the transmission and reception of signals. A channel can include a single radio frequency or a plurality of radio frequencies.

In a shared band operation, a specific band can be divided between different users or operators of the cellular communication system. Shared band operation can include licensed shared band operation or unlicensed shared band operation. In licensed shared band operation, one or more operators can purchase a specific portion of an available radio spectrum for transmission and reception of cellular signals. A radio spectrum is a portion of an electromagnetic spectrum corresponding to radio frequencies. A purchased portion of the radio spectrum is also referred to as a licensed band. The licensed band is shared between the one or more operators. The sharing of the licensed band can enable operators to deploy local access points on the licensed shared band. An example of a local access point is a femtocell, which is a small cellular base station. The sharing of the licensed band can also enable operators to allow device-to-device communication between two or more communication devices on the licensed shared band. The sharing of the licensed band can also be controlled by a central operator, or a plurality of operators can agree that the licensed band is to be shared and that access is to be contended by the plurality of operators.

In unlicensed shared band operation, the band is not owned by any operator and is referred to as an unlicensed band. The unlicensed band can be utilized by any system, and thus, is referred to as an unlicensed shared band. Some unlicensed shared bands, while not owned by any operator, are regulated, and the communication devices on those unlicensed shared bands must still follow regulations. Example radio technologies operating on unlicensed shared bands include wireless local area networks (WLAN), Bluetooth (BT) networks, and Zigbee networks. Due to the fact that an unlicensed shared band is available and for use by any communication device, the interference environment can be unpredictable. This can mean that predetermined quality of service (QoS) cannot be guaranteed.

Communication on an unlicensed shared band is generally based on sharing an available channel between different communication devices. The different communication devices may utilize a common RAT, but in certain scenarios, the different communication devices may utilize different RATs. In an unlicensed shared band, channel access can be distributed, where communication devices can detect a channel, and utilize a channel reservation scheme known to other communication devices in order to reserve a right to access the channel. In distributed channel access, a transmitting communication device and a receiving communication device are generally not synchronized to a global reference. Thus, in the beginning of each transmitted packet, a common sequence can be transmitted by the transmitting communication device in order to allow the receiving communication device to synchronize itself with, and lock on to, the transmission.

Transmissions on an unlicensed shared band, that do not utilize a common timing reference shared by the transmitting communication device and the receiving communication device, are generally short in duration in order to allow multiple communication devices to share the channel. Generally, in this scenario, a transmitting communication device only transmits a few packets at a time before the transmitting communication device defers its access to another transmitting communication device that also occupies the channel. After a random duration (which can depend on the number of communication devices sharing the channel), the transmitting communication device transmits again. Therefore, specific measures are required in order to initially synchronize the transmitting communication device and receiving communication device in the beginning of each data transmission by synchronizing the receiving communication device with the data transmission (i.e., informing the receiving communication device when the first packet of the data transmission begins). In addition to synchronization, the transmitting communication device can indicate frequency resources that can be utilized for transmission. In general, a transmitting communication device may only utilize a portion of the frequency resources, and can indicate to the receiving communication device which portion of the frequency resources the transmitting communication device will utilize for transmission.

SUMMARY

According to an embodiment of the invention, a method includes transmitting a first synchronization signal including a first cyclic shift over a shared band, where the first synchronization signal synchronizes a communication device with a transmission over the shared band. The method further includes mapping a second cyclic shift to one or more resources of one or more channels of the shared band. The method further includes transmitting a second synchronization signal including the second cyclic shift over the shared band, where the second synchronization signal indicates the one or more resources of the one or more channels of the shared band.

According to another embodiment, an apparatus includes a processor and a memory including computer program code. The memory and the computer program code are configured to, with the processor, cause the apparatus to transmit a first synchronization signal including a first cyclic shift over a shared band, where the first synchronization signal synchronizes a communication device with a transmission over the shared band. The memory and the computer program code are further configured to, with the processor, cause the apparatus to map a second cyclic shift to one or more resources of one or more channels of the shared band. The memory and the computer program code are configured to, with the processor, cause the apparatus to transmit a second synchronization signal including the second cyclic shift over the shared band, wherein the second synchronization signal indicates the one or more resources of the one or more channels of the shared band.

According to another embodiment, a computer program product includes a computer-readable medium bearing computer program code embodied therein for use with a computer. The computer program code includes code for transmitting a first synchronization signal including a first cyclic shift over a shared band, where the first synchronization signal synchronizes a communication device with a transmission over the shared band. The computer program code further includes code for mapping a second cyclic shift to one or more resources of one or more channels of the shared band. The computer program code further includes code for transmitting a second synchronization signal including the second cyclic shift over the shared band, where the second synchronization signal indicates the one or more resources of the one or more channels of the shared band.

According to another embodiment, a method includes mapping a first cyclic shift to one or more resources of one or more channels of a shared band. The method further includes transmitting a first synchronization signal including the first cyclic shift over the shared band, where the first synchronization signal synchronizes a communication device with a transmission over the shared band and indicates the one or more resources of the one or more channels of the shared band.

According to another embodiment, an apparatus includes a processor and a memory including computer program code. The memory and the computer program code are configured to, with the processor, cause the apparatus to map a first cyclic shift to one or more resources of one or more channels of a shared band. The memory and the computer program code are further configured to, with the processor cause the apparatus to transmit a first synchronization signal including the first cyclic shift over the shared band, where the first synchronization signal synchronizes a communication device with a transmission over the shared band and indicates the one or more resources of the one or more channels of the shared band.

According to another embodiment, a method includes receiving a first synchronization signal that includes a first cyclic shift over a shared band. The method further includes synchronizing a communication device with a transmission over the shared band utilizing the first synchronization signal. The method further includes receiving a second synchronization signal that includes a second cyclic shift over the shared band. The method further includes determining one or more resources of one or more channels of the shared band utilizing the second synchronization signal.

According to another embodiment, an apparatus includes a processor and a memory including computer program code. the memory and the computer program code are configured to, with the processor, cause the apparatus to receive a first synchronization signal that includes a first cyclic shift over a shared band. The memory and the computer program code are further configured to, with the processor cause the apparatus to synchronize the apparatus with a transmission over the shared band utilizing the first synchronization signal. The memory and the computer program code are further configured to, with the processor cause the apparatus to receive a second synchronization signal that includes a second cyclic shift over the shared band. The memory and the computer program code are further configured to, with the processor cause the apparatus to determine one or more resources of one or more channels of the shared band utilizing the second synchronization signal.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein.

DETAILED DESCRIPTION

It will be readily understood that the components of the present invention, as generally described and illustrated in the figures herein, may be arranged and designed in a wide variety of different configurations. Thus, the following detailed description of the embodiments of a method, apparatus, system, and computer readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "an embodiment," "one embodiment," "an alternative embodiment," "certain embodiments," "some embodiments," "different embodiments" or other similar language, throughout this specification refers to the fact that a particular feature, structure, or characteristic described in connection with the embodiment may be included in at least one embodiment of the present invention. Thus, appearances of the phrases "an embodiment," "one embodiment," "an alternative embodiment," "in certain embodiments," "in some embodiments," "in other embodiments," "in different embodiments," or other similar language, throughout this specification do not necessarily all refer to the same group of embodiments, and the described features, structures, or characteristics may be combined in any suitable manner in one or more embodiments.

While the term "packet" has been used in the description of the present invention, the invention may be applied to many types of data that can be communicated, such as frame, signal, datagram, message, etc. For purposes of this invention, the term "packet" also includes frame, signal, datagram, message, and any equivalents thereof.

As licensed shared band operation has been increasingly utilized, portions of the radio spectrum that remain available have become limited. Thus, operators, service providers, communication device manufacturers, and communication system manufacturers, are all seeking efficient solutions to utilize unlicensed shared band operation. As previously described, unlicensed shared band operation generally involves sharing one or more channels in a communication system between one or more communication devices, where the communication devices can utilize different RATs. Thus, what is needed is a communication system that can provide effective asynchronous/contention-based access over a shared band with dynamic and scalable spectrum allocation.

Figure 1:
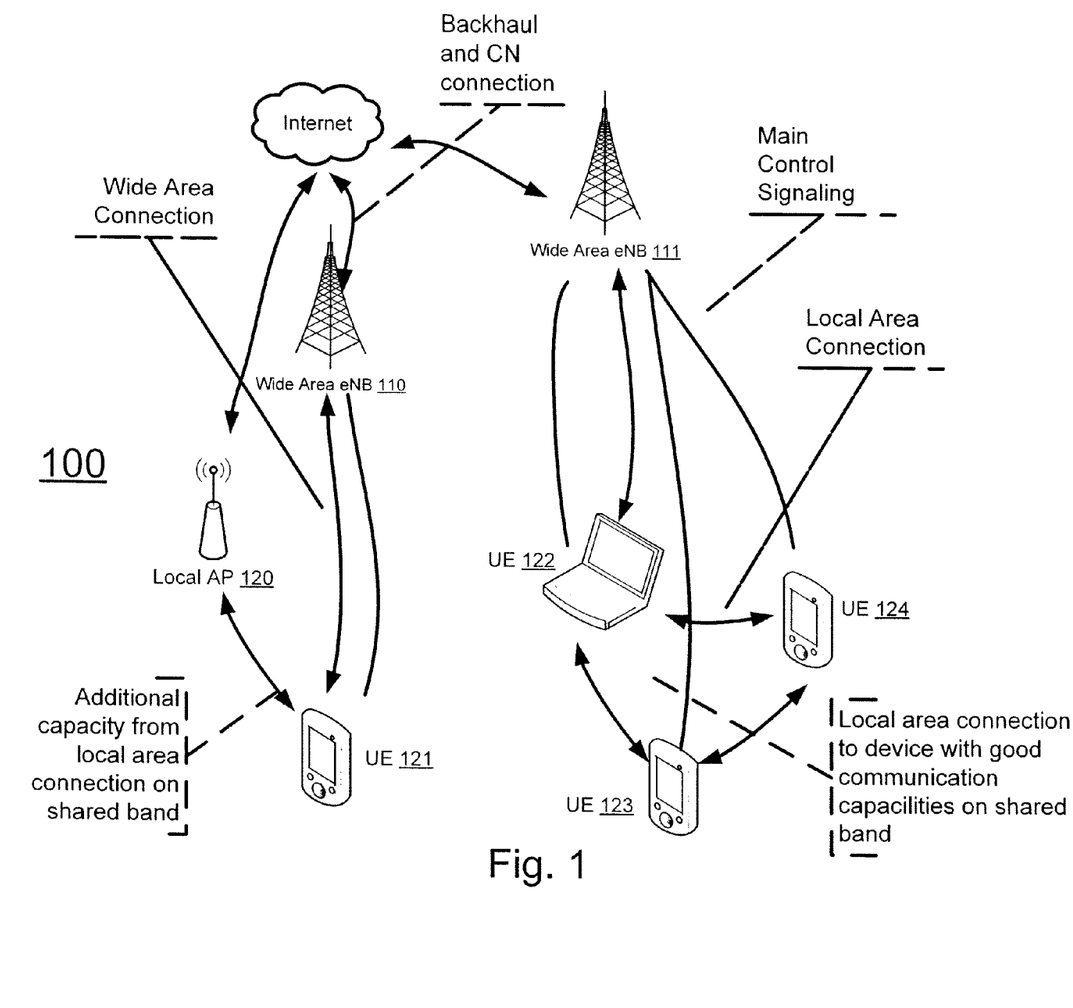
FIG. 1 illustrates a communication system utilizing shared bands according to an embodiment of the invention.

FIG. 1 illustrates a communication system 100 utilizing shared bands according to an embodiment of the invention. System 100 includes various communication devices, including wide area evolved Node Bs (eNBs) 110 and 111, local access point (AP) 120, and user equipments (UEs) 121, 122, 123, and 124. Wide area eNBs 110 and 111 are examples of base transceiver stations that are configured to facilitate communication between UEs and a communication system, such as communication system 100. Wide area eNBs 110 and 111 each include a transmitter configured to transmit packets to UEs, and a receiver configured to receive packets from UEs. The transmitter and receiver can be separate components of each wide area eNB, or can be part of a transceiver located within each wide area eNB. Local AP 120 is an example of an access point that is also configured to facilitate communication between UEs and a communication system, such as communication system 100. Local AP 120 also includes a transmitter configured to transmit packets to UEs, and a receiver configured to receive packets from UEs. Similarly, the transmitter and receiver can be separate components of local AP 120, or can be part of a transceiver located within local AP 120. UEs 121, 122, 123, and 124 are examples of communication devices used by users of a communication system, such as system 100, to communicate with other users. A UE can be a handheld device, such as a cellular phone, a smartphone, or a personal digital assistant (PDA), a laptop computer equipped with a mobile adapter, or any other type of device.

One of ordinary skill in the art would readily understand that the system 100 is capable of having any number of communication devices within the system. Accordingly, one of ordinary skill in the art would readily understand that system 100 as illustrated in FIG. 1 is an example embodiment of a communication system according to the present invention, and does not limit the scope of the present invention to a particular configuration or a particular number of communication devices.

FIG. 1 also includes arrows which illustrate, according to the embodiment, that the communication devices of system 100 are configured to communicate with each other. As one of ordinary skill in the art would readily appreciate, communicating involves transmitting and receiving one or more packets over one or more shared bands. According to the embodiment, wide area eNB 110 is configured to communicate with local AP 120 and visa-versa. Similarly, wide area eNB is configured to communicate with UE 121 and visa-versa. Likewise, local AP 120 is configured to communicate with UE 121 and visa-versa. In a similar fashion, wide area eNB 111 is configured to communicate with UE 122 and visa-versa. In addition, UEs 122, 123, and 124 are each configured to communicate with each other. Furthermore, wide area eNB 110 is configured to provide main control signaling to UE 121, and wide area eNB 111 is configured to provide main control signaling to UEs 122, 123, and 124. System 100 is also capable of communicating with the Internet, which is external to system 100. More specifically, wide area eNBs 110 and 111, and local AP 120, are each configured to communicate with the Internet using a backhaul connection, or a core network (CN) connection.

According to the embodiment, system 100 is configured to provide both a wide area connection and a local area connection to UEs 121, 122, 123, and 124. A wide area connection is a connection that allows communication between communication devices over a broad geographical area. For example, a wide area connection can allow communication between communication devices over distances that span hundreds or thousands of miles. In contrast, a local area connection is a connection that allows communication between communication devices over a limited geographical area. For example, a local area connection can allow communication between communication devices located within a home, a school, a university campus, a computer laboratory, or an office building. In the illustrated embodiment of FIG. 1, wide area eNB 110 is configured to provide a wide area connection to UE 121, local AP 120 is configured to provide a local area connection to UE 121, wide area eNB 111 is configured to provide a wide area connection to UEs 122, 123, and 124, and UEs 122, 123, and 124 are each configured to provide a local area connection to each other. However, one of ordinary skill in the art would readily appreciate that this is merely an example configuration of system 100, and that system 100 can have other configurations and still be within the scope of the invention.

As previously described, communication devices of system 100 are configured to communicate with each other. As also previously described, communication involves the transmitting and receiving of packets over one or more channels, from a first communication device to a second communication device, and visa-versa. According to an embodiment, the transmitting involves duplex methods. A duplex method is a communication method that allows communication in both directions (i.e., from a first communication device to a second communication device and visa-versa).

Two types of duplex methods are time-division duplexing (TDD) and frequency-division duplexing (FDD). TDD involves a transmission of packets in a first direction, such as an uplink transmission, and a transmission of packets in a second direction, such as a downlink transmission, over a channel. It appears that the uplink and downlink transmissions are occurring simultaneously as sub-channels of the channel, but the uplink and downlink transmissions are actually taking turns on the channel. FDD also involves two transmissions of packets, with each transmission being in a different direction, such as an uplink transmission and a downlink transmission, over a channel. However, in FDD, the uplink and downlink transmissions occur at the same time at different carrier frequencies of the channel.

According to the embodiment, system 100 is capable of facilitating both TDD and FDD simultaneously, and communication devices of system 100 can be configured to utilize both TDD and FDD. In the embodiment, the communication devices configured to utilize a wide area connection (i.e., wide area eNBs 110 and 111) can be configured to utilize FDD, and the communication devices configured to utilize a local area connection (i.e., local AP 120 and UEs 122, 123, and 124) can be configured to utilize TDD. However, this is merely an example configuration, and one of ordinary skill in the art would readily appreciate that both TDD and FDD can be utilized on either a wide area connection or a local area connection.

According to the embodiment, system 100 can utilize one or more shared bands to facilitate communication between the communication devices, where the one or more shared bands are divided between the communication devices of system 100. The one or more shared bands can include licensed shared bands, unlicensed shared bands, or a combination of the two. In the illustrated embodiment of FIG. 1, the communication devices configured to utilize a wide area connection (i.e., wide area eNBs 110 and 111) can be configured to utilize one or more licensed shared bands, and the communication devices configured to utilize a local area connection (i.e., local AP 120 and UEs 122, 123, and 124) can be configured to utilize one or more unlicensed shared bands. However, this is merely an example configuration, and one of ordinary skill in the art would readily appreciate that both licensed shared bands and unlicensed shared bands can be utilized on either a wide area connection or a local area connection.

As previously described, in unlicensed share band operation, when multiple communication devices share a channel, a transmitting communication device generally only transmits a few packets over the channel before the transmitting communication device defers to another transmitting communication device. After a certain duration in which the other transmitting communication devices have transmitted over the channel, the first transmitting communication device is able to continue transmitting packets over the channel. As also previously discussed, before each transmission, the transmitting communication device is required to initially synchronize the receiving communication device with the transmission.

According to an embodiment of the invention, a transmitting communication device can be configured to transmit one or more primary synchronization signals (PSSs). A PSS is a specially designed signal that can be transmitted by a transmitting communication device to enable synchronization of a receiving communication device. A reception of a PSS by a receiving communication device enables time and frequency synchronization by determining a slot timing and slot boundaries, so that the receiving communication device knows at which time interval and frequency the transmitting communication device will transmit a packet. The reception of the PSS also provides the receiving communication device with a physical layer cell identity, and a cyclic prefix length. A physical layer cell identity is the identity of the cell that the transmitting communication device is transmitting in. A cyclic prefix is a prefixing of a symbol with a repetition of the symbol's end. The reception of the PSS also informs the receiving communication device whether the transmitting communication devices uses FDD or TDD.

While in certain embodiments, synchronization can performed using one or more PSSs, in alternative embodiments, synchronization can performed by using a combination of PSSs and secondary synchronization signals (SSSs), where a SSS is another type of specially designed signal that enables synchronization of a receiving communication device.

In accordance with an embodiment of the invention, an eNB can be configured to transmit the PSSs to UEs, and in device to device connection, a UE can also be configured to transmit the PSSs to other UEs. UEs that receive a transmitted PSS can be configured to detect the PSS, where the detection of the PSS can enable time and frequency synchronization, provides the UE with a physical layer cell identity, and a cyclic prefix length, and inform the UE whether the eNB (or transmitting UE) uses FDD or TDD. The synchronization provided by the PSS can be useful in scenarios where there is no common clock reference available for a transmitting communication device and a receiving communication device.

As previously described, a transmitting communication device may only utilize a portion of the frequency resources of one or more channels, and can indicate to the receiving communication device which portion of the frequency resources the transmitting communication device will utilize for transmission. Thus, according to an embodiment of the invention, a transmitting communication device can use one or more transmitted PSSs to map one or more resources of one or more channels that are utilized for transmission in addition to using the one or more transmitted PSSs to synchronize a receiving communication device with the transmission. According to the embodiment, the transmitting communication device can utilize cyclic shifts of the PSSs by mapping a cyclic shift of a PSS to one or more resources of one or more channels. According to an embodiment, a PSS includes a cyclic shift which has good auto-correlation and cross-correlation properties, and thus, different cyclic shifts can be detected by a receiving communication device. Thus, according to the embodiment, a new technique of utilizing a PSS is provided.

An available bandwidth on a shared band can be divided into one or more channels, where each channel can include one or more resources. According to an embodiment of the invention, a transmitting communication device can observe the available bandwidth on the shared band, observe the availability of one or more channels in the shared band, and determine one or more resources of the one or more channels available for transmission. In one embodiment, the transmitting communication device can transmit two or more PSSs in sequence, where a first PSS is transmitted that includes a first cyclic shift (also identified as a base cyclic shift), and the second PSS signal is transmitted that includes a second cyclic shift (also identified as a variable cyclic shift). According to the embodiment, the variable cyclic shift can be mapped to the one or more available resources of the one or more channels. Thus, in accordance with the embodiment, the two or more PSSs can provide synchronization and resource allocation. In an alternate embodiment, a single PSS is transmitted that includes the variable cyclic shift, where the variable cyclic shift can be mapped to the one or more available resources of the one or more channels. Thus, in accordance with the embodiment, the single PSS can provide synchronization and resource allocation. In an embodiment of the invention, a resource allocation tree can be used for mapping a cyclic shift to one or more resources of one or more channels.

Figure 2:
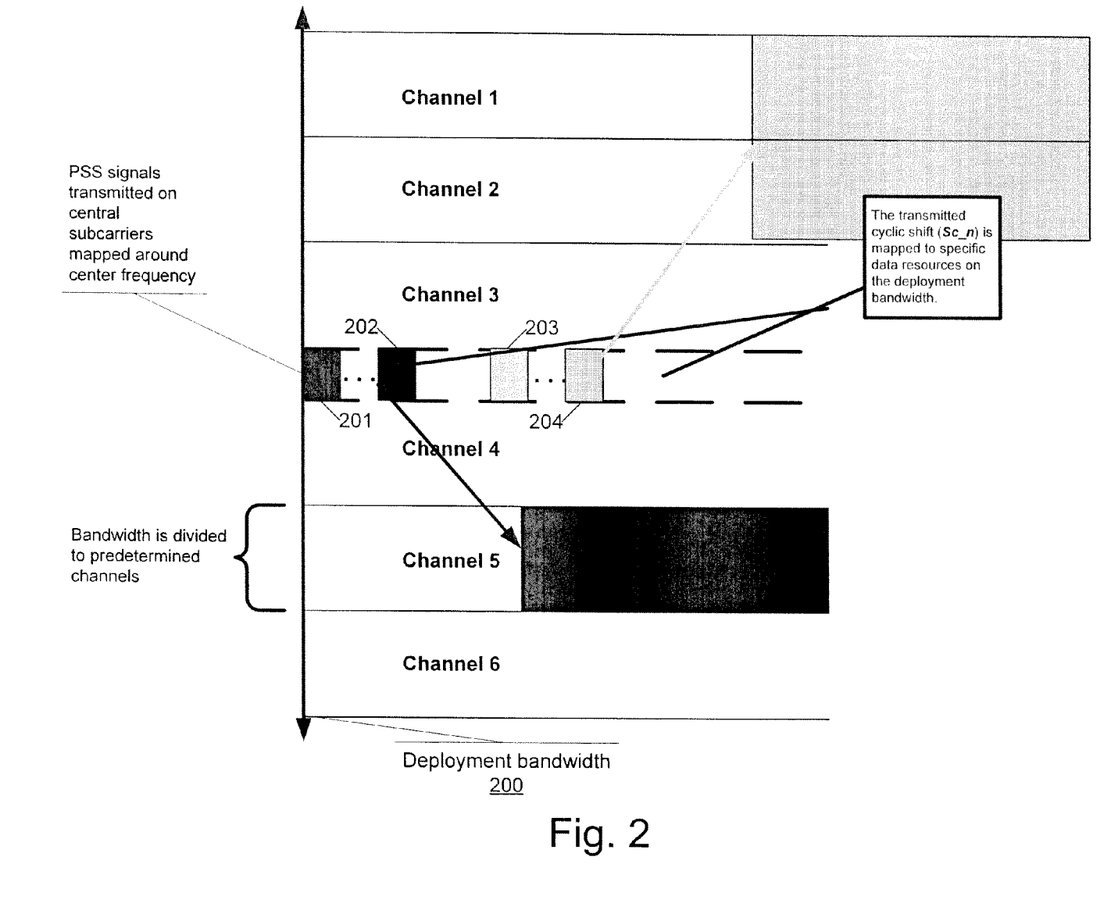
FIG. 2 illustrates a deployment bandwidth of a shared band and a mapping of cyclic shifts to one or more resources of one or more channels according to an embodiment of the invention.

FIG. 2 illustrates a deployment bandwidth 200 of a shared band and a mapping of cyclic shifts to one or more resources of one or more channels according to an embodiment of the invention. Deployment bandwidth 200 represents an available bandwidth of a shared band utilized by a transmitting communication device, in accordance with an embodiment of the invention. The deployment bandwidth can be known by, or agreed by, communication devices via a control information exchange.

According to the embodiment, deployment bandwidth is divided into one or more channels, also identified as virtual channels. In the illustrated embodiment of FIG. 2, deployment bandwidth 200 includes channels 1, 2, 3, 4, 5, and 6. However, FIG. 2 merely represents an example embodiment, and one of ordinary skill in the art would readily appreciate that deployment bandwidth 200 can include any number of channels, and still be within the scope of the invention. Each channel can include one or more resource blocks. A resource block is used to describe a mapping of one or more channels to one or more resources. Each resource block can include any number of subcarriers (i.e., M subcarriers), where a subcarrier is a separate signal carried on a main radio transmission. A resource block is defined as any number of consecutive orthogonal frequency-division multiplexing (OFDM) symbols (i.e., N consecutive OFDM symbols) in a time domain, and any number of consecutive subcarriers (i.e., M consecutive subcarriers) in a frequency domain. Thus, a resource block includes N×M resource elements, corresponding to one slot in the time domain, and 180 kHZ in the frequency domain. Furthermore, according to an embodiment, each channel can have a different number of resources available.

According to the embodiment, deployment bandwidth 200 can include a control channel (not shown), identified as a shared band control channel (SHBCC). The control channel is mapped around a center frequency. A center frequency includes a plurality of subcarriers. According to the embodiment, the plurality of subcarriers of the center frequency can be used by a transmitting communication device to transmit one or more PSSs, to a receiving communication device, as illustrated in FIG. 2. The one or more PSSs are transmitted with a cyclic shift, in accordance with the embodiment. In FIG. 2, the cyclic shift is represented as "Sc_n." In accordance with the embodiment, the one or more PSSs can be utilized to synchronize the receiving communication device with a transmission, and to indicate one or more resources of one or more channels to be utilized in the transmission.

For example in the illustrated embodiment, a transmitting communication device first transmits PSS 201. A first receiving communication device receives PSS 201 and utilizes PSS 201 to synchronize itself with a first transmission. The transmitting communication device subsequently transmits PSS 202, which includes a cyclic shift. The first receiving communication device receives PSS 202 and determines that one or more resources of channel 5 will be utilized in the first transmission based on the cyclic shift of PSS 202. Likewise, the transmitting communication device subsequently transmits PSS 203. A second receiving communication device receives PSS 203 and utilizes PSS 203 to synchronize itself with a second transmission. The transmitting communication device subsequently transmits PSS 204, which includes a cyclic shift. The second receiving communication device receives PSS 204 and determines that one or more resources of channels 1 and 2 will be utilized in the second transmission based on the cyclic shift of PSS 204.

The sequence of PSSs transmitted by the transmitting communication device differs depending on the embodiment of the invention. In a first embodiment, the transmitting communication device transmits two PSSs. The first PSS is transmitted, where the first PSS includes a first cyclic shift (i.e., a base cyclic shift). The second PSS is transmitted, where the second PSS includes a second cyclic shift (i.e., a variable cyclic shift). The variable cyclic shift can be mapped to the one or more available resources of the one or more channels. A receiving communication device can receive the first PSS that includes the base cyclic shift and the second PSS that includes the variable cyclic shift to synchronize itself with a transmission and determine the one or more resources used for the transmission. Thus, the first PSS and second PSS can be used by the receiving communication device for synchronization and resource allocation.

In a second embodiment, the transmitting communication device transmits three PSSs, a first PSS, a second PSS, and an intermediate PSS. Similar to the first embodiment, the first PSS is transmitted, where the first PSS includes a first cyclic shift (i.e., a base cyclic shift). Also similar to the first embodiment, a receiving device can receive the first PSS that includes the base cyclic shift and synchronize itself with a transmission. The intermediate PSS is subsequently transmitted. The receiving communication device can receive the intermediate PSS, and thus, be informed of the transmission. The second PSS is subsequently transmitted, where the second PSS includes a second cyclic shift (i.e., a variable cyclic shift), similar to the first embodiment. The variable cyclic shift can be mapped to the one or more available resources of the one or more channels. The receiving communication device can receive the second PSS that includes the variable cyclic shift to determine the one or more resources used for the transmission. Thus, the first PSS, the intermediate PSS, and the second PSS can be used by the receiving communication device for synchronization and resource allocation.

In a third embodiment, the transmitting communication device transmits a single PSS. The single PSS is transmitted, where the single PSS includes a variable cyclic shift. The variable cyclic shift can be mapped to the one or more available resources of the one or more channels. In this embodiment, the receiving communication device is already aware of the base cyclic shift, and monitors each PSS that is transmitted until the receiving communication device receives the single PSS that includes the variable cyclic shift. According to the embodiment, the receiving communication device can receive the single PSS to synchronize itself with a transmission and determine the one or more resources used for the transmission. Thus, the single PSS can be used by the receiving communication device for synchronization and resource allocation.

Figure 3:
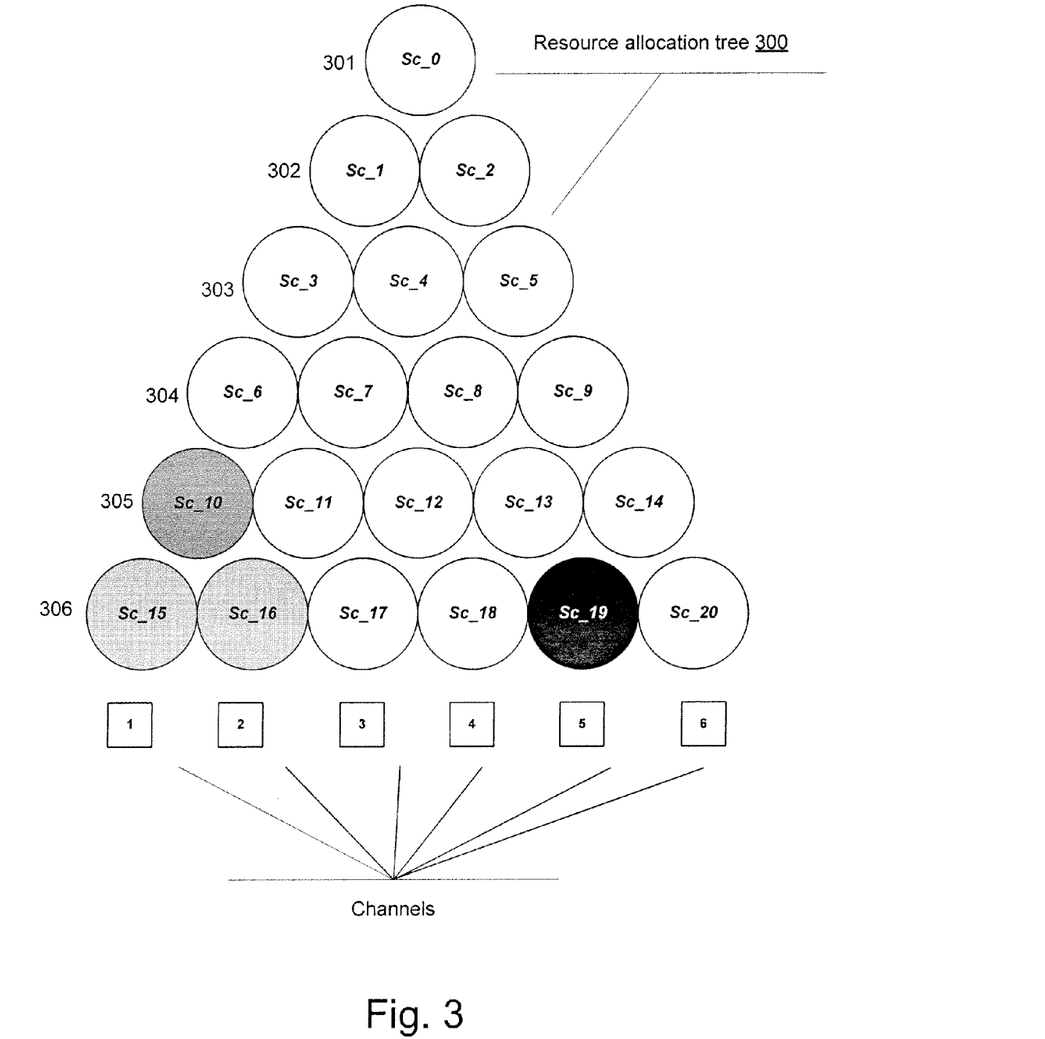
FIG. 3 illustrates a resource allocation tree utilized to map cyclic shifts to one or more resources of one or more channels according to an embodiment of the invention.

FIG. 3 illustrates a resource allocation tree 300 utilized to map cyclic shifts to one or more resources of one or more channels according to an embodiment of the invention. According to the embodiment, resource allocation tree 300 includes one or more resources that correspond to one or more channels. In the illustrated embodiment of FIG. 3, resource allocation tree 300 includes one or more resources that correspond to six channels, channels 1, 2, 3, 4, 5, and 6. However, FIG. 3 merely represents an example embodiment, and one of ordinary skill in the art would readily appreciate that resource allocation tree 300 can include one or more channels associated with any number of channels, and still be within the scope of the invention.

According to the embodiment, resource allocation tree 300 also includes one or more branches. In the illustrated embodiment of FIG. 3, resource allocation tree 300 includes six branches, branches 301, 302, 303, 304, 305, and 306. However, FIG. 3 merely represents an example embodiment, and one of ordinary skill in the art would readily appreciate that resource allocation tree 300 can include any number of branches, and still be within the scope of the invention.

According to the embodiment, each branch of resource allocation tree 300 includes one or more clusters, where each cluster includes one or more resource blocks, where each resource block includes one or more resources, and where each cluster is represented by a circle in FIG. 3. Also according to the embodiment, each cluster has a cyclic shift mapped to the cluster. In the illustrated embodiment of FIG. 3, a cluster in branch 301 has cyclic shift Sc_0 mapped to it, and two clusters in branch 302 have cyclic shifts Sc_1 and Sc_2 mapped to them, respectively. Further, three clusters in branch 303 have cyclic shifts Sc_3, Sc_4, and Sc_5 mapped to them, respectively, and four clusters in branch 304 have cyclic shifts Sc_6, Sc_7, Sc_8, and Sc_9 mapped to them, respectively. Likewise, five clusters in branch 305 have cyclic shifts Sc_10, Sc_11, Sc_12, Sc_13, and Sc_14 mapped to them respectively, and six clusters in branch 306 have cyclic shifts Sc_15, Sc_16, Sc_17, Sc_18, Sc_19, and Sc_20 mapped to them, respectively. However, FIG. 3 merely represents an example embodiment, and one of ordinary skill in the art would readily appreciate that any cyclic shift can be mapped to any cluster of one or more resource blocks, and still be within the scope of the invention.

Each cluster can include a different number of resource blocks, and thus, each cluster can have a different size, in accordance with the embodiment. In the illustrated embodiment of FIG. 3, cluster Sc_0 is of a size that only one cluster fits within branch 301, clusters Sc_1 and Sc_2 are each of a size that two clusters fit within branch 302, clusters Sc_3, Sc_4, and Sc_5 are each of a size that three clusters fit within branch 303, clusters Sc_6, Sc_7, Sc_8, and Sc_9 are each of a size that four clusters fit within branch 304, clusters Sc_10, Sc_11, Sc_12, Sc_13, and Sc_14 are each of a size that five clusters fit within branch 305, and clusters Sc_15, Sc_16, Sc_17, Sc_18, Sc_19, and Sc_20 are each of a size that six clusters fit within branch 306. However, FIG. 3 merely represents an example embodiment, and one of ordinary skill in the art would readily appreciate that any cluster of resource blocks can have any size, and include any number of resource blocks, and still be within the scope of the invention.

Thus, according to the illustrated embodiment in FIG. 3, each cyclic shift is mapped to one or more resources of one or more channels. Thus, when a transmitting communication device transmits a PSS that includes a cyclic shift, the cyclic shift is mapped to one or more resources of one or more channels by resource allocation tree 300. Therefore, when a receiving communication device receives the PSS, and detects the cyclic shift, the receiving communication device can determine the one or more resources of one or more channels that will be utilized in a transmission based on the cyclic shift.

Figure 4:
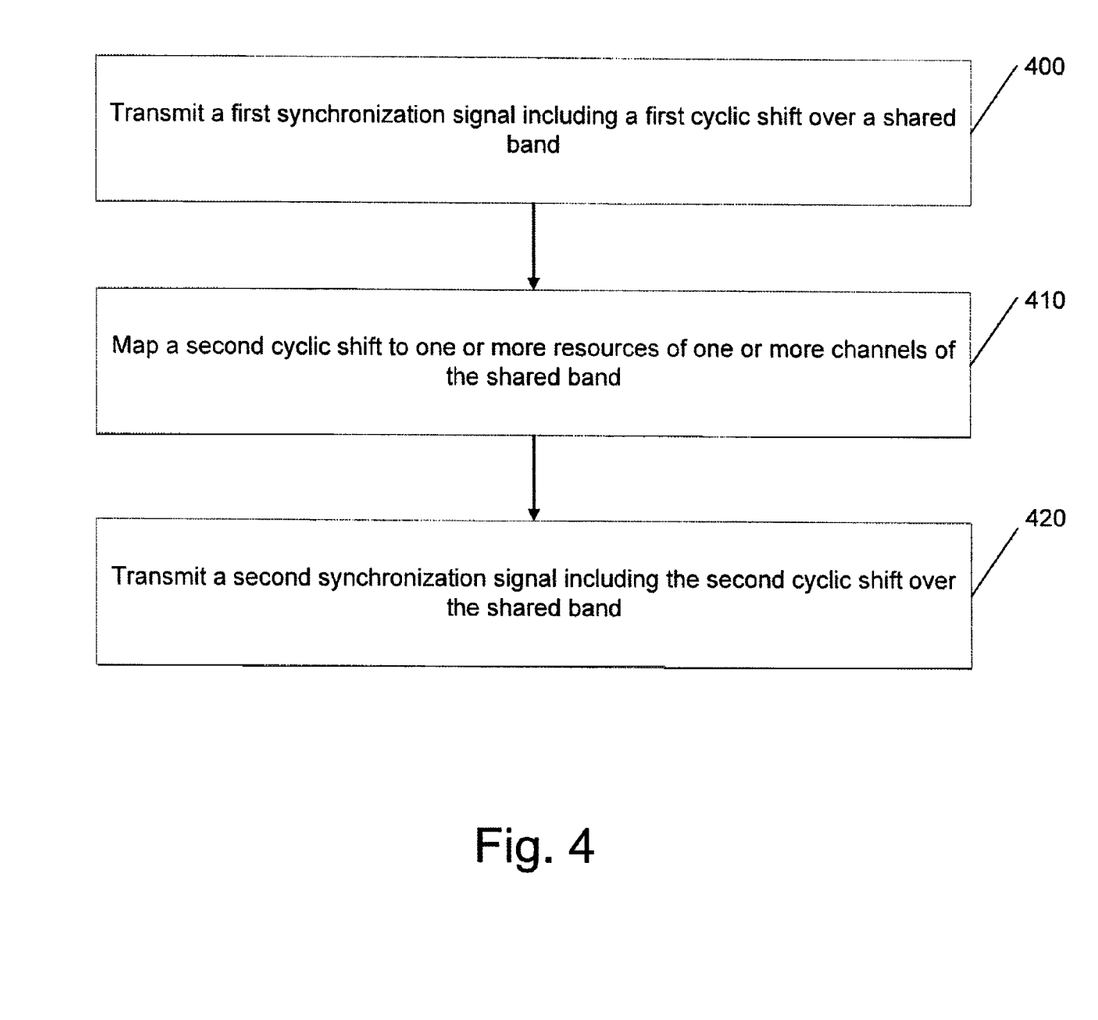
FIG. 4 illustrates a method according to an embodiment of the invention.

FIG. 4 illustrates a flow diagram of a method according to an embodiment of the invention. At step 400, a first synchronization signal including a first cyclic shift is transmitted over a shared band. According to the embodiment, the first synchronization signal synchronizes a communication device with a transmission over the shared band. At step 410, a second cyclic shift is mapped to one or more resources of one or more channels of the shared band. At step 420, a second synchronization signal including the second cyclic shift is transmitted over the shared band. According to the embodiment, the second synchronization signal indicates the one or more resources of the one or more channels of the shared band.

In one embodiment, the second cyclic shift is mapped to a cluster of a resource allocation tree. According to the embodiment, the resource allocation tree includes one or more clusters, each cluster includes one or more resource blocks, and each resource block includes one or more resources. In one embodiment, each cluster of the resource allocation tree includes a different number of resource blocks. However, in an alternative embodiment, each cluster of the resource allocation includes the same number of resource blocks.

In another embodiment, the first and second synchronization signals are transmitted over a center frequency. According to the embodiment, the center frequency includes a plurality of subcarriers. Also according to the embodiment, the center frequency includes a shared band control channel.

In another embodiment, the transmitting performed at step 400, the mapping performed at step 410, and the transmitting performed at step 420, are each performed by an evolved node B. In an alternative embodiment, the transmitting performed at step 400, the mapping performed at step 410, and the transmitting performed at step 420, are each performed by a user equipment.

Figure 5:
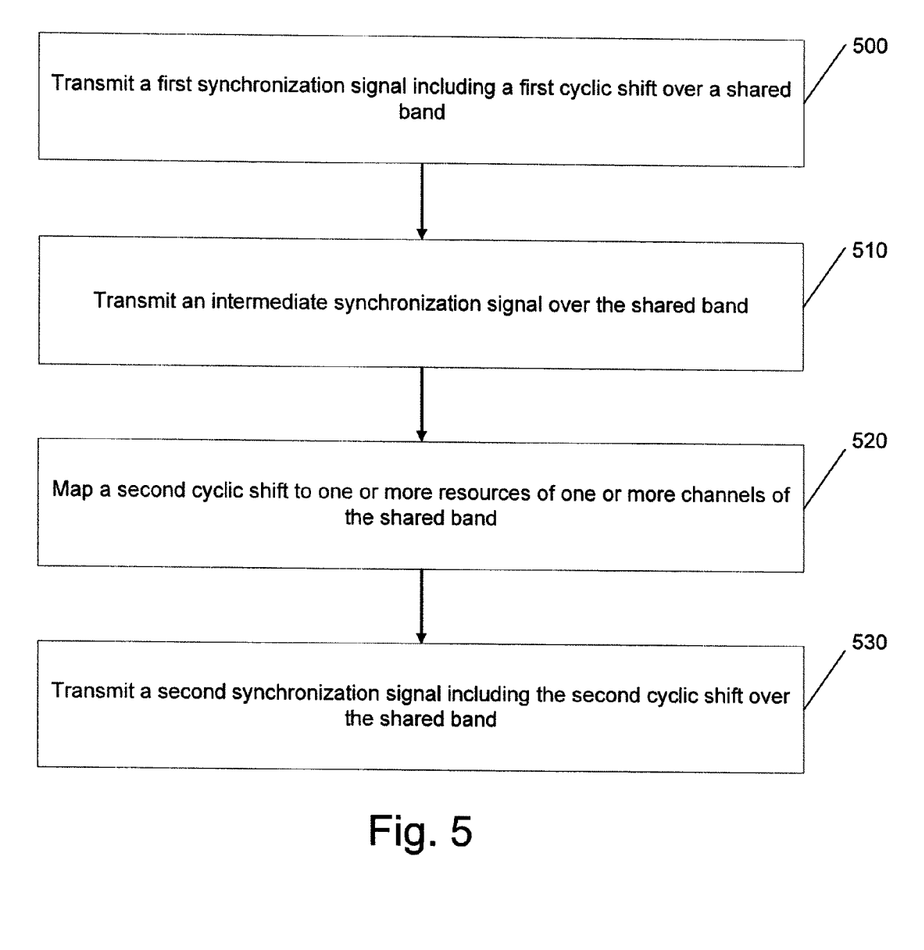
FIG. 5 illustrates a method according to another embodiment of the invention.

FIG. 5 illustrates a flow diagram of a method according to another embodiment of the invention. At step 500, a first synchronization signal including a first cyclic shift is transmitted over a shared band. According to the embodiment, the first synchronization signal synchronizes a communication device with a transmission over the shared band. At step 510, an intermediate synchronization signal is transmitted over the shared band. According to the embodiment, the intermediate synchronization signal informs the communication device of the transmission over the shared band. At step 520, a second cyclic shift is mapped to one or more resources of one or more channels of the shared band. At step 530, a second synchronization signal including the second cyclic shift is transmitted over the shared band. According to the embodiment, the second synchronization signal indicates the one or more resources of the one or more channels of the shared band. In one embodiment, the intermediate synchronization signal is transmitted before the second synchronization signal.

Figure 6:
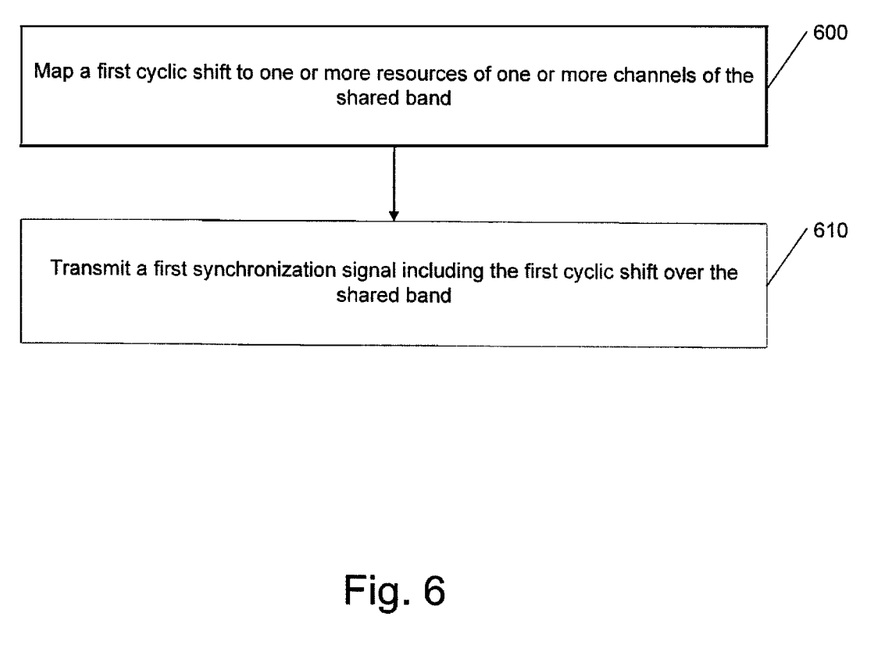
FIG. 6 illustrates a method according to another embodiment of the invention.

FIG. 6 illustrates a flow diagram of a method according to another embodiment of the invention. At step 600, a first cyclic shift is mapped to one or more resources of one or more channels of a shared band. At step 610, a first synchronization signal including the first cyclic shift is transmitted over the shared band. According to the embodiment, the first synchronization signal synchronizes a communication device with a transmission over the shared band, and indicates the one or more resources of the one or more channels of the shared band.

The steps of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components.

Figure 7:
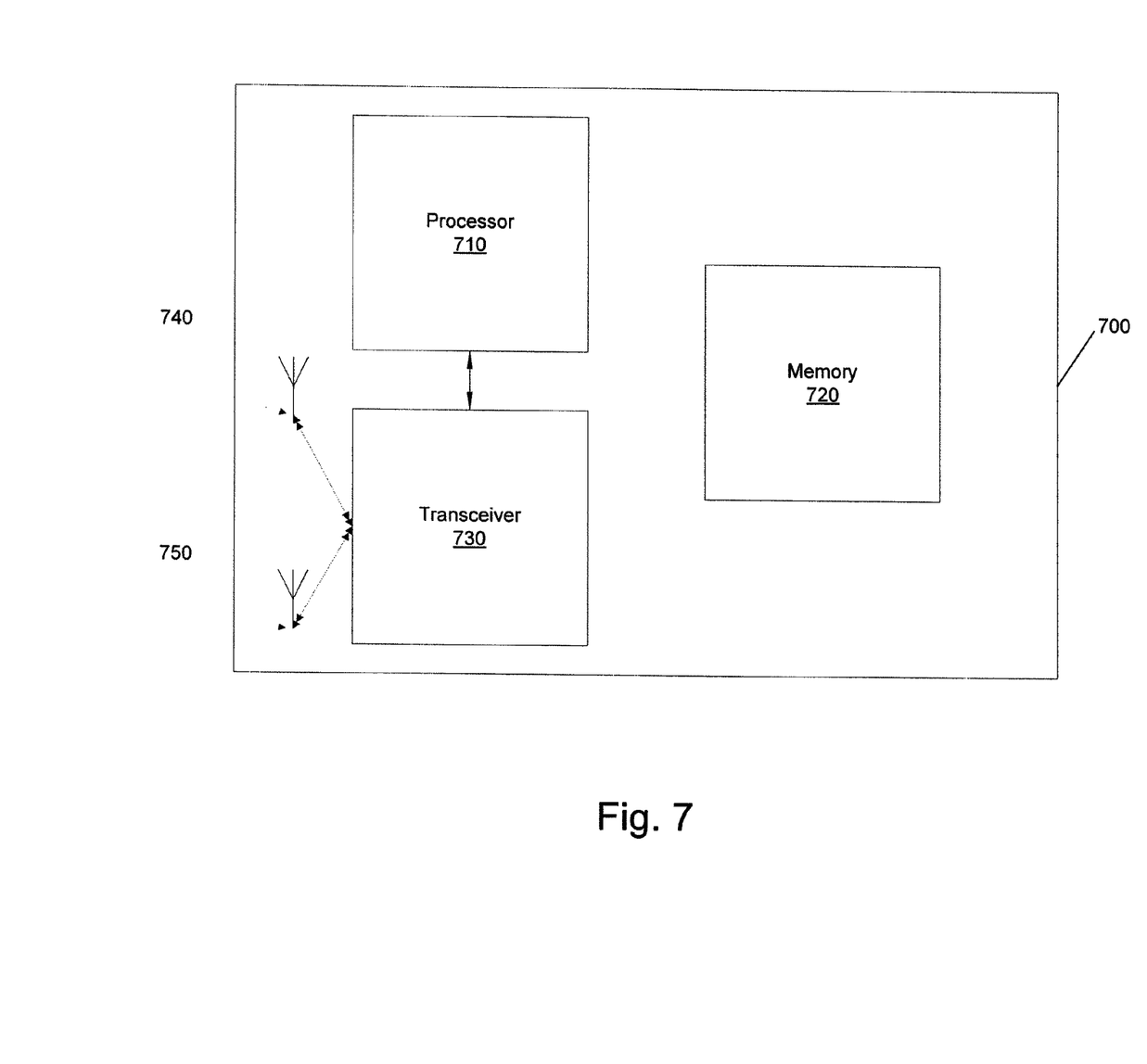
FIG. 7 illustrates an apparatus according to an embodiment of the invention.

FIG. 7 illustrates an apparatus 700 according to an embodiment of the invention. Apparatus 700 can include a processor 710 and a memory 720, in accordance with the embodiment. Processor 710 can read information from, and write information to, memory 720. Processor 710 can be a front end processor, a back end processor, a microprocessor, a digital signal processor, a processor with an accompanying digital signal processor, a special-purpose computer chip, a field-programmable gate array (FPGA), a controller, an ASIC, or a computer. Memory 720 can be RAM, flash memory, ROM, EPROM, EEPROM, registers, hard disk, a removable disk, a CD-ROM, or any other form of storage medium known in the art. Memory 720 can include computer program code. As one of ordinary skill in the art would readily appreciate, apparatus 700 can include any number of processors in alternative embodiments. Likewise, apparatus 700 can include any number of memories in alternative embodiments.

Apparatus 700 can also include a transceiver 730, which is configured to transmit and receive a packet, and which is connected to processor 710, in accordance with the embodiment. In an alternative embodiment, apparatus 700 can include a transmitter and receiver (not shown) in place of transceiver 730, where the transmitter is configured to transmit a packet, where the receiver is configured to receive a packet, and where the transmitter and the receiver are separate components. According to an embodiment, apparatus 700 can also include antennas 740 and 750, where each antenna is configured to assist transceiver 730 (or the transmitter and the receiver, in an alternate embodiment) in the transmitting and receiving of a packet. While the illustrated embodiment in FIG. 7 depicts two antennas, one of ordinary skill in the art would readily appreciate that apparatus 700 can include any number of antennas in alternative embodiments. In an alternative embodiment, apparatus 700 can include a single antenna.

In one embodiment, processor 710 and memory 720 can cause apparatus 700 to transmit a first synchronization signal including a first cyclic shift over a shared band. According to the embodiment, the first synchronization signal synchronizes a communication device with a transmission over the shared band. Processor 710 and memory 720 can also cause apparatus 700 to map a second cyclic shift to one or more resources of one or more channels of the shared band. Processor 710 and memory 720 can also cause apparatus 700 to transmit a second synchronization signal including the second cyclic shift over the shared band. According to the embodiment, the second synchronization signal indicates the one or more resources of the one or more channels of the shared band.

In another embodiment, processor 710 and memory 720 can cause apparatus 700 to transmit a first synchronization signal including a first cyclic shift over a shared band. According to the embodiment, the first synchronization signal synchronizes a communication device with a transmission over the shared band. Processor 710 and memory 720 can also cause apparatus 700 to transmit an intermediate synchronization signal over the shared band. According to the embodiment, the intermediate synchronization signal informs the communication device of the transmission over the shared band. Processor 710 and memory 720 can also cause apparatus 700 to map a second cyclic shift to one or more resources of one or more channels of the shared band. Processor 710 and memory 720 can also cause apparatus 700 to transmit a second synchronization signal including the second cyclic shift over the shared band. According to the embodiment, the second synchronization signal indicates the one or more resources of the one or more channels of the shared band. In one embodiment, apparatus 700 can transmit the intermediate synchronization signal before the second synchronization signal.

In another embodiment, processor 710 and memory 720 can cause apparatus 700 to map a first cyclic shift to one or more resources of one or more channels of a shared band. Processor 710 and memory 720 can also cause apparatus 700 to transmit a first synchronization signal including the first cyclic shift over the shared band. According to the embodiment, the first synchronization signal synchronizes a communication device with a transmission over the shared band and indicates the one or more resources of the one or more channels of the shared band.

Thus, according to certain embodiments, a combined synchronization and resource allocation method can be provided that does not require an explicit control channel, or control signal, for indicating one or more resources for data transmission. Furthermore, according to certain embodiments, a transmitting communication device can scale a resource utilization based on a need and availability, and also perform synchronization at the same time.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:
1. A method, comprising:
transmitting a first primary synchronization signal comprising a first cyclic shift over a shared band, wherein the first primary synchronization signal synchronizes a communication device with a transmission over the shared band;
mapping a second cyclic shift to one or more resources of one or more channels of the shared band; and
transmitting a second primary synchronization signal comprising the second cyclic shift over the shared band, wherein the second primary synchronization signal indicates the one or more resources of the one or more channels of the shared band.

2. The method of claim 1, further comprising:
transmitting an intermediate synchronization signal over the shared band, wherein the intermediate synchronization signal informs the communication device of the transmission over the shared band.

3. The method of claim 2, wherein the intermediate synchronization signal is transmitted before the second primary synchronization signal is transmitted.

4. The method of claim 1,
wherein the mapping the second cyclic shift to the one or more resources of the one or more channels of the shared band comprises mapping the second cyclic shift to a cluster of a resource allocation tree,
wherein the resource allocation tree comprises one or more clusters,
wherein each cluster comprises one or more resource blocks, and
wherein each resource block comprises one or more resources.

5. The method of claim 4, wherein each cluster of the resource allocation tree comprises a different number of resource blocks.

6. The method of claim 1,
wherein the first and second primary synchronization signals are transmitted over a center frequency, and
wherein the center frequency comprises a plurality of subcarriers.

7. The method of claim 6, wherein the center frequency comprises a shared band control channel.

8. The method of claim 1, wherein the transmitting and the mapping are performed by one of an evolved node B and a user equipment.

9. An apparatus, comprising:
a processor; and
a memory comprising computer program code,
the memory and the computer program code configured to, with the processor, cause the apparatus to
transmit a first primary synchronization signal comprising a first cyclic shift over a shared band, wherein the first primary synchronization signal synchronizes a communication device with a transmission over the shared band;
map a second cyclic shift to one or more resources of one or more channels of the shared band; and
transmit a second primary synchronization signal comprising the second cyclic shift over the shared band, wherein the second primary synchronization signal indicates the one or more resources of the one or more channels of the shared band.

10. The apparatus of claim 9, the memory and the computer program code further configured to, with the processor, cause the apparatus to transmit an intermediate synchronization signal over the shared band, wherein the intermediate synchronization signal informs the communication device of the transmission over the shared band.

11. The apparatus of claim 10, the memory and the computer program code further configured to, with the processor, cause the apparatus to transmit the intermediate synchronization signal before the second primary synchronization signal.

12. The apparatus of claim 9,
the memory and the computer program code further configured to, with the processor, cause the apparatus to map the second cyclic shift to a cluster of a resource allocation tree,
wherein the resource allocation tree comprises one or more clusters,
wherein each cluster comprises one or more resource blocks, and
wherein each resource block comprises one or more resources.

13. The apparatus of claim 12, wherein each cluster of the resource allocation tree comprises a different number of resource blocks.

14. The apparatus of claim 9,
the memory and the computer program code further configured to, with the processor, cause the apparatus to transmit the first and second primary synchronization signals over a center frequency,
wherein the center frequency comprises a plurality of subcarriers.

15. The apparatus of claim 14, wherein the center frequency comprises a shared band control channel.

16. The apparatus of claim 9, wherein the apparatus comprises one of an evolved Node B and a user equipment.

17. A computer program product comprising a non-transitory computer-readable medium bearing computer program code embodied therein for use with a computer, the computer code comprising:
code for transmitting a first primary synchronization signal comprising a first cyclic shift over a shared band, wherein the first primary synchronization signal synchronizes a communication device with a transmission over the shared band;
code for mapping a second cyclic shift to one or more resources of one or more channels of the shared band; and
code for transmitting a second primary synchronization signal comprising the second cyclic shift over the shared band, wherein the second primary synchronization signal indicates the one or more resources of the one or more channels of the shared band.

18. A method, comprising:
mapping a first cyclic shift to one or more resources of one or more channels of a shared band; and
transmitting a first primary synchronization signal comprising the first cyclic shift over the shared band, wherein the first primary synchronization signal synchronizes a communication device with a transmission over the shared band and indicates the one or more resources of the one or more channels of the shared band.

19. An apparatus, comprising:
a processor; and
a memory comprising computer program code,
the memory and the computer program code configured to, with the processor, cause the apparatus to
map a first cyclic shift to one or more resources of one or more channels of a shared band; and
transmit a first primary synchronization signal comprising the first cyclic shift over the shared band, wherein the first primary synchronization signal synchronizes a communication device with a transmission over the shared band and indicates the one or more resources of the one or more channels of the shared band.

20. An apparatus, comprising:
a processor; and
a memory comprising computer program code,
the memory and the computer program code configured to, with the processor, cause the apparatus to
receive a first primary synchronization signal comprising a first cyclic shift over a shared band;
synchronize the apparatus with a transmission over the shared band utilizing the first primary synchronization signal;
receive a second primary synchronization signal comprising a second cyclic shift over the shared band, wherein the second cyclic shift is mapped to one or more resources of one or more channels of the shared band; and
determine the one or more resources of one or more channels of the shared band utilizing the second primary synchronization signal.

* * * * *